US007673006B2

(12) United States Patent
Bhogal et al.

(10) Patent No.: US 7,673,006 B2
(45) Date of Patent: *Mar. 2, 2010

(54) COLLABORATIVE EMAIL WITH DELEGABLE AUTHORITIES

(75) Inventors: Kulvir Singh Bhogal, Fort Worth, TX (US); Robert J. Kamper, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 12/143,426

(22) Filed: Jun. 20, 2008

(65) Prior Publication Data

US 2008/0250474 A1    Oct. 9, 2008

Related U.S. Application Data

(63) Continuation of application No. 10/835,336, filed on Apr. 29, 2004, now Pat. No. 7,437,421.

(51) Int. Cl.
*G06F 15/16* (2006.01)
*G06F 3/00* (2006.01)

(52) U.S. Cl. .................. 709/206; 709/205; 715/753
(58) Field of Classification Search ................. 709/206, 709/205; 715/753
See application file for complete search history.

(56) References Cited

U.S. PATENT DOCUMENTS

| | | | |
|---|---|---|---|
| 5,093,918 | A | 3/1992 | Heven et al. |
| 5,220,657 | A | 6/1993 | Bly et al. |
| 5,787,175 | A | 7/1998 | Carter |
| 6,005,571 | A | 12/1999 | Pachauri |
| 6,266,682 | B1 | 7/2001 | LaMarca et al. |
| 6,505,233 | B1 | 1/2003 | Hanson et al. |
| 6,507,865 | B1 | 1/2003 | Hanson et al. |
| 6,525,747 | B1 | 2/2003 | Bezos |

(Continued)

FOREIGN PATENT DOCUMENTS

EP       1 104 964 A1    6/2001

(Continued)

OTHER PUBLICATIONS

Project Magic; Research Disclosure, RD 438142; Oct. 2000; pp. 1850-1851; US.

(Continued)

*Primary Examiner*—George C Neurauter, Jr.
*Assistant Examiner*—Kishin G Belani
(74) *Attorney, Agent, or Firm*—H. Artoush Ohanian; Justin Dillon; Biggers & Ohanian, LLP.

(57) ABSTRACT

Writing a collaborative email document with hierarchical authorities including establishing a collaborative email document on an administrator's computer, identifying one or more signatories for the document, identifying one or more collaborators who are authorized to view and edit the document, providing to the collaborators copies of the document for viewing and editing, where the collaborators' copies reside on collaborators' computers, updating the copies of the document on collaborators' computers with revisions from the collaborators, and sending the collaborative email document from the administrator's computer to addressees when the document bears valid digital signatures from all signatories. Typical embodiments also include providing at least one user authority to delegate signature authority, establishing a hierarchy of delegation authority for signatures, establishing at least one authority delegation policy including at least one rule for automated delegation of signature authority among signatories and delegating signature authority from at least one signatory to another.

2 Claims, 9 Drawing Sheets

U.S. PATENT DOCUMENTS

| | | |
|---|---|---|
| 2001/0003202 A1 | 6/2001 | Mache et al. |
| 2001/0037273 A1 | 11/2001 | Greenlee |
| 2001/0039553 A1 | 11/2001 | LaMarca et al. |
| 2002/0099777 A1 | 7/2002 | Gupta et al. |
| 2003/0028600 A1 | 2/2003 | Parker et al. |
| 2003/0050981 A1 | 3/2003 | Banerjee et al. |
| 2003/0182177 A1 | 9/2003 | Gallagher et al. |
| 2003/0220855 A1 | 11/2003 | Lam et al. |
| 2003/0237051 A1 | 12/2003 | LaMarca et al. |
| 2004/0044648 A1 | 3/2004 | Anfindsen et al. |
| 2004/0172450 A1 | 9/2004 | Edelstein et al. |
| 2004/0230658 A1 | 11/2004 | Estrada et al. |
| 2005/0034079 A1 | 2/2005 | Gunasekar et al. |
| 2005/0188016 A1 | 8/2005 | Vdaygiri et al. |

FOREIGN PATENT DOCUMENTS

| | | |
|---|---|---|
| WO | WO 02/01823 A2 | 1/2002 |
| WO | WO 02/073886 A1 | 9/2002 |

OTHER PUBLICATIONS

Dynamically Structured Messaging Mechanism; Research Disclosure; RD 444187; Apr. 2001; pp. 681-686; US.

Ellis, et al.; Groupware: Some Issues and Experiences; Jan. 1991; pp. 38-58; vol. 34, No. 1; ACM; US.

Stefik, et al.; WYSIWIS Revised: Early Experiences with Multiuser Interface; Apr. 1987; pp. 1147-1167; Vo. 5, No. 2; AMC Transactions on Office Information Systems; US.

Cederqvist, et al.; Version Management with CVS; 1993; CVS 1.11.19; pp. 1-184; US.

COLLABORATIVE EMAIL WITH DELEGABLE AUTHORITIES

CROSS-REFERENCE TO RELATED APPLICATION

This application is a continuation application of and claims priority from U.S. patent application Ser. No. 10/835,336, filed on Apr. 29, 2004 which is a continuation-in-part of a co-pending U.S. patent application entitled "COLLABORATIVE EMAIL," having Ser. No. 10/637,020 and filing date of Aug. 7, 2003.

BACKGROUND OF THE INVENTION

1. Field of the Invention

The field of the invention is data processing, or, more specifically, methods, systems, and products for collaborative email with delegable authorities.

2. Description of Related Art

Systems for collaboration in developing email documents generally maintain a master copy of a document in a central location, record changes in the master copy, and update collaborators' copies by providing a new copy of the entire document. This uses a lot of bandwidth, particularly when there are many revisions over a period of time. There are version control systems, such as Unix's Source Code Control System or 'SCCS' and the open-source version control system known as the Concurrent Versions System or 'CVS.' Such systems are strongly oriented to version control for source code documents, however, and do not integrate very well with collaborative email, lacking, as they do, support for such collaborative features as automated updates to certain revision levels or authentication through valid digital signatures and delegable authorities for signing, viewing, and editing collaborative email documents. For these reasons, there is an ongoing need for improvements in systems and methods for collaborative email.

SUMMARY OF THE INVENTION

Method, systems, and products are disclosed for writing a collaborative email document with hierarchical authorities including establishing a collaborative email document on an administrator's computer, identifying one or more signatories for the document, identifying one or more collaborators who are authorized to view and edit the document, providing to the collaborators copies of the document for viewing and editing, where the collaborators' copies reside on collaborators' computers, updating the copies of the document on collaborators' computers with revisions from the collaborators, and sending the collaborative email document from the administrator's computer to addressees when the document bears valid digital signatures from all signatories. Typical embodiments also include providing to at least one user authority to delegate signature authority. Typical embodiments also include establishing a hierarchy of delegation authority for signatures, establishing at least one authority delegation policy including at least one rule for automated delegation of signature authority among signatories in the hierarchy, and delegating signature authority from at least one signatory to another signatory in accordance with the authority delegation policy. Typical embodiments also include establishing at least one authority delegation policy including at least one rule for automated delegation of signature authority, and delegating signature authority from at least one signatory to another signatory in accordance with the authority delegation policy.

In typical embodiments include rules for automated delegation of signature authority including a rule that the signature authority of a first signatory having a first position in a hierarchy of delegation authority may be delegated to a second signatory having a second position in the hierarchy of delegation authority, where the second position is higher in the hierarchy than the first position, a rule that a first signatory having a first position in the hierarchy of delegation authority may digitally sign the collaborative email document only after a second signatory having a second position in the hierarchy of delegation authority has signed the collaborative email document, where the second position is higher in the hierarchy than the first position, a rule that signature authority is to be delegated to a second signatory if a first signatory does not sign the document within a specified period of time, and a rule that signature authority may be delegated during a specified period of time. Typical embodiments include establishing one or more authority delegation type parameters that identify modes of delegating authority for signatories, assigning at least one authority delegation type parameter to the collaborative email document, and delegating signature authority from at least one signatory to another signatory in accordance with the assigned authority delegation type parameter.

Typical embodiments' modes of delegating authority for signatories include a mode in which signature authority is delegated according to authority delegation policies, a mode in which signature authority is delegated by an originator of the collaborative email document, and a mode in which one or more collaborators are authorized to delegate signature authority to at least one signatory. Typical embodiments also include establishing time parameters for writing the collaborative email document, providing alerts and reminders in accordance with the established time parameters, and forwarding copies of the collaborative email document to delegated backup collaborators in accordance with the established time parameters.

Typical embodiments also include providing for at least one collaborator authority to delegate the authority to view and edit the collaborative email document. Typical embodiments also include identifying editable portions of the email document, and specifying that only certain collaborators are authorized to view and edit one or more portions of the document, where authority to view and edit one or more portions of the document includes authority to delegate to another collaborator the authority to view and edit one or more portions of the document.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
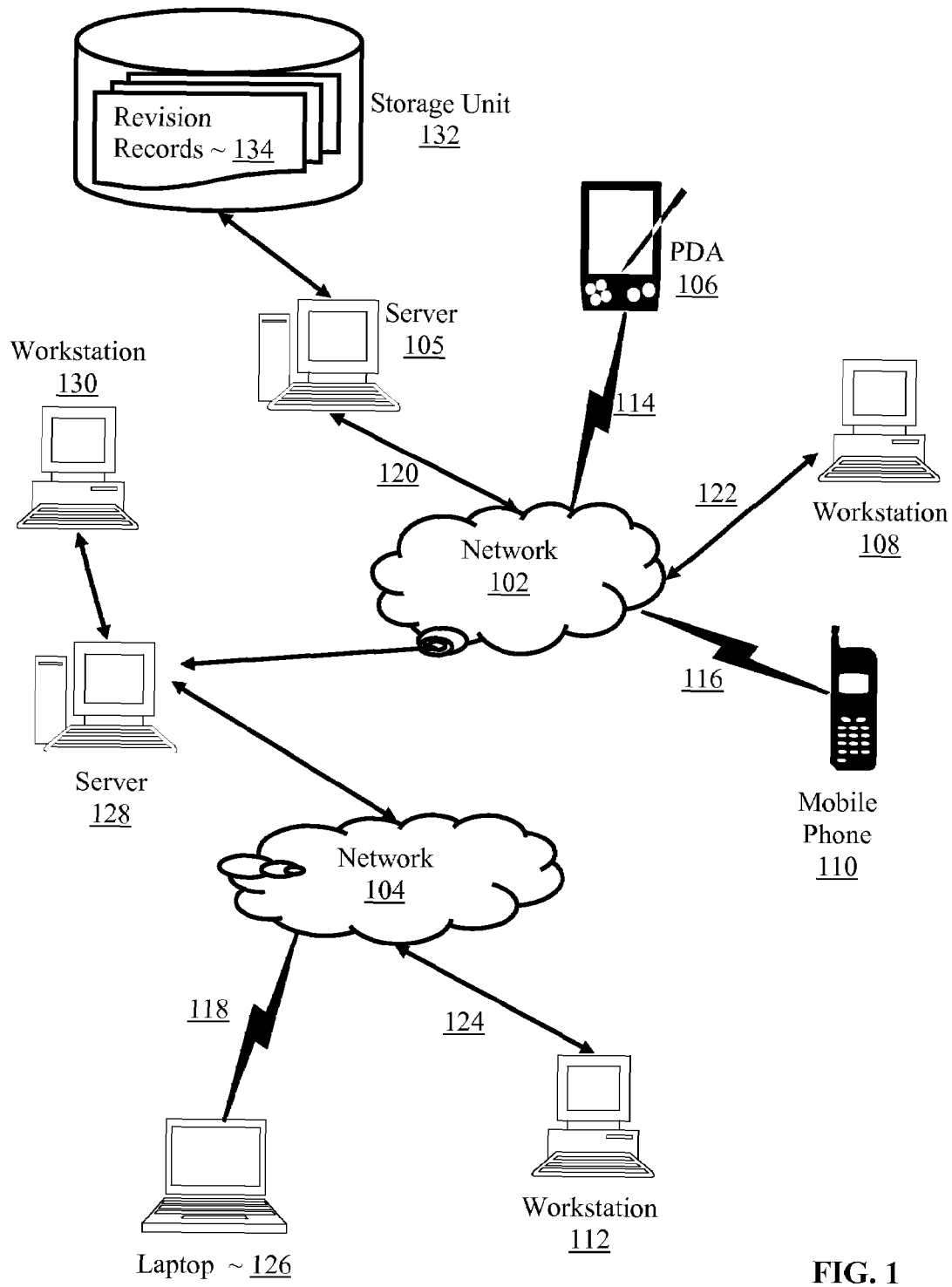
FIG. 1 depicts an architecture for a data processing system in which various embodiments of the present invention may be implemented.

The present invention is described to a large extent in this specification in terms of methods for collaborative email with delegable authorities. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, transmission media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

In this specification, the terms "field," "data element," and "attribute," unless the context indicates otherwise, generally are used as synonyms, referring to individual elements of information, typically represented as digital data. Aggregates of data elements are referred to as "records" or "data structures." Aggregates of records are referred to as "tables" or "files." Aggregates of files or tables are referred to as "databases." In the context of tables in databases, fields may be referred to as "columns," and records may be referred to as "rows." Complex data structures that include member methods, functions, or software routines as well as data elements are referred to as "classes." Instances of classes are referred to as "objects" or "class objects."

"CGI" means "Common Gateway Interface," a standard technology for data communications of resources between web servers and web clients. CGI provides a standard interface between servers and server-side 'gateway' programs that administer actual reads and writes of data to and from files systems and databases.

"Client," "client device," "client machine," or "client computer" means any computer or other automated computing machinery capable of administering collaborative email according to embodiments of the present invention. Examples include personal computers, PDAs, mobile telephones, laptop computers, handheld devices, and others as will occur to those of skill in the art. Clients include devices capable of wireless as well as wireline communications.

"HDML" stands for 'Handheld Device Markup Language,' a markup language used to format content for web-enabled mobile phones. HDML is proprietary to Openwave Systems, Inc., and can only be operated on phones that use Openwave browsers. Rather than WAP, HDML operates over Openwave's Handheld Device Transport Protocol ("HDTP").

"HTML" stands for 'HyperText Markup Language,' a standard markup language for displaying web pages on browsers.

"HTTP" stands for 'HyperText Transport Protocol,' a standard data communications protocol of the World Wide Web. HTTP is a hyperlinking protocol. In exemplary embodiments of the present invention, asynchronous communications of revisions are often implemented by use of hyperlinking protocols. Other examples of hyperlinking protocols include HDML and WAP.

"POP" means Post Office Protocol, referring to the standard protocol for communicating email messages from email servers to email clients. "POP3" is a standard Post Office Protocol capable of communicating email messages among email servers and both to and from email clients, which means that POP3 is now useful as a single email protocol with no need for SMTP.

"Server" in this specification refers to a computer or other automated computing machinery on a network that manages resources, including documents, and requests for access to such resources. A "web server," is a server that communicates with clients through data communications application programs, such as browsers or microbrowsers, by means of hyperlinking protocols such as HTTP, WAP, or HDTP, in order to manage and make available to networked computers documents, digital objects, and other resources. Servers generally include applications programs that that accept data communications connections in order to service requests from clients by sending back responses. Any given computer or program therefore may be both a client and a server. The use of these terms in this disclosure refers primarily to the role being performed by the computer or program for a particular connection or coupling for data communications, rather than to the computer or program's capabilities in general.

"SMTP" means Simple Mail Transfer Protocol, referring to the standard protocol for communicating email messages from email clients to email servers and from email servers to other email servers. It is typical in prior art that SMTP is used to communicate email messages from source email clients to mailbox locations, and POP is then used to communicate the email messages from mailboxes to destination email clients.

"TCP/IP" refers to two layers of a standard OSI data communications protocol stack. The network layer is implemented with the Internet Protocol, hence the initials 'IP.' And the transport layer is implemented with the Transport Control Protocol, referred to as 'TCP.' The two protocols are used together so frequently that they are often referred to as the TCP/IP suite, or, more simply, just 'TCP/IP.' TCP/IP is the standard data transport suite for the well-known world-wide network of computers called 'the Internet.'

"WAP" refers to the Wireless Application Protocol, a protocol for use with handheld wireless devices. Examples of wireless devices useful with WAP include mobile phones, pagers, two-way radios, hand-held computers, and PDAs. WAP supports many wireless networks, and WAP is supported by many operating systems. WAP supports HTML, XML, and particularly WML (the Wireless Markup Language), which is a language particularly designed for small screen and one-hand navigation without a keyboard or mouse. Operating systems specifically engineered for handheld devices include PalmOS, EPOC, Windows CE, FLEXOS, OS/9, and JavaOS. WAP devices that use displays and access the Internet run "microbrowsers." The microbrowsers use small file sizes that can accommodate the low memory constraints of handheld devices and the low-bandwidth constraints of wireless networks.

Collaborative Email with Delegable Authorities

Methods and systems according to the present invention generally implement collaborative email with delegable authorities by identifying collaborators authorized to view and edit a collaborative email document as it is being written. Segments of the document may be identified that only particular collaborators are authorized to view and edit. Revisions are typically streamed asynchronously (or synchronously) among collaborators' clients through one or more servers. Such methods and systems typically identify an administrator for the document on whose client is maintained an administrative copy of the document. The administrator may or may not be an authorized collaborator, but the administrator's copy of the document may be synchronized to a current version of the document, so that the administrator may provide administrative services regarding development of the document, administrative services such as monitoring document status, securing valid digital signatures from signatories, and finally transmitting the final version of the document to addressees.

In such systems, the addressees may or may not include the collaborators, and the signatories may or may not be collaborators. For example, a manager may assign the manager's secretary to create a collaborative document, type its initial contents, and act as administrator for development of the document. The manager may designate one or more executives as signatories, executives known to the manager as responsible for the subject area of the document. The manager may or may not be a signatory. The manager may designate collaborators who will receive copies of the document to view and edit while the document is being written. In fact, it may be said that the collaborative edits or revisions to the document actually implement the writing of the document. The manager may or may not be listed as a collaborator.

Methods for writing a collaborative email document with hierarchical authorities according to embodiments of the present invention typically include identifying one or more signatories for the document. Many such methods include providing to at least one user authority to delegate signature authority. Such a user may be an originator of a collaborative email document, an administrator of a collaborative email document, a collaborator, a signatory, or another user as will occur to those of skill in the art. According to this specification, delegation of signature authority is more than 'delegation' in the strictly legal sense. Delegation here includes not only assignment of an authority possessed by a delegator, but also assignments by proxy of an authority not possessed by the delegator—as when a collaborator who is not a signatory is authorized to delegate to a signatory signature authority not possessed by the collaborator. Another example is the delegation by an originator or administrator of a collaborative email document of signatory authority not possessed by the originator or administrator. That is, an originator of a collaborative email document or an administrator who identifies one or more signatories for a document, in the act of so identifying a signatory is effectively delegating signature authority to the signatory so identified. Such an originator or administrator need have no signature authority in his or her own right.

Delegation of signature authority may be carried out according to a hierarchy of delegation authority established for the purpose of such delegation. Delegation of signature authority may be carried out according to authority delegation policies comprising rules for automated delegation of signature authority, including delegation among signatories in a hierarchy of delegation authority. In addition, delegation of signature authority may be carried out according to authority delegation type parameters, where each such authority delegation type parameter identifies a mode of delegating authority for signatories. Delegation of signature authority also may be carried out according to time parameters and alerts and reminders triggered off the time parameters. A copy of a collaborative email document may be forwarded to delegated backup collaborators according to such time parameters.

Methods according to embodiments of the present invention typically include identifying one or more collaborators who are authorized to view and edit the document. Many such methods include providing for at least one such collaborator authority to delegate the authority to view and edit the collaborative email document. Many methods according to embodiments of the present invention also include identifying editable portions of a collaborative email document and specifying that only certain collaborators are authorized to view and edit one or more portions of the document. In such methods, authority to view and edit one or more portions of the document often includes the authority to delegate to another collaborator the authority to view and edit one or more portions of the document.

When the collaborators are finished editing the document, the administrator may email it to the signatories for digital signatures. After all required signatures are affixed to the document, the administrator may 'send' the document to its addressees. In email clients improved according to embodiments of the present invention, the email client's 'send' function typically is not enabled for sending to addressees until all required signatures are present. The send button on collaborators' clients typically is not enabled at all. The administrator's copy is updated with revisions just as are all the collaborators' copies. The only thing that distinguishes operation of the administrator's client from collaborators' email clients is that sending to addressees typically will eventually become enabled on the administrator's client (when the document is signed), but not so on collaborators' clients.

Exemplary methods, system, and products for collaborative email with delegable authorities are further explained with reference to the accompanying drawings, beginning with FIG. 1. FIG. 1 depicts an architecture for a data processing system in which various embodiments of the present invention may be implemented. The system of FIG. 1 includes a number of computers coupled for data communications in networks. Each of the computers depicted may function as an email client or server according to embodiments of the present invention.

The system of FIG. 1 includes networks 102, 104. Networks in such systems may comprise LANs, WANs, intranets, internets, the Internet, webs, and the World Wide Web itself. Such networks comprise media that may be used to provide couplings for data communications between various devices and computers connected together within a distributed data processing system. Such networks may include permanent couplings, such as wire or fiber optic cables, or temporary couplings made through wireline telephone or wireless communications.

In the example of FIG. 1, server 128 and server 105 are connected to network 102. Storage unit 132 is connected to network 102 through server 105. Revisions records 134 identifying revisions to a collaborative email document according to embodiments of the present invention may be stored on storage units like storage unit 132. In addition, several exemplary client devices including a PDA 106, a workstation 108, and a mobile phone 110 are connected to network 102. Network-enabled mobile phone 110 connects to network 102 through wireless link 116, and PDA 106 connects to network 102 through wireless link 114. In the example of FIG. 1, server 128 couples directly to client workstation 130 and network 104 (which may be a LAN), which incorporates wireless communication links supporting a wireless coupling to laptop computer 126 and wireline protocols supporting a wired coupling to client workstation 112. Each of these exemplary client devices may support email clients for collaborative email according to embodiments of the present invention.

Client devices and servers in such distributed processing systems may be represented by a variety of computing devices, such as mainframes, personal computers, personal digital assistants, web-enabled mobile telephones, and so on. The particular servers and client devices illustrated in FIG. 1 are for explanation, not for limitation. Data processing systems may include additional servers, clients, routers, other devices, and peer-to-peer architectures, not shown in FIG. 1, as will occur to those of skill in the art. Networks in such distributed data processing systems may support many data communications protocols, TCP/IP, HTTP, WAP, HDTP, SMS, SMNT, POP, and others as will occur to those of skill in the art. Various embodiments of the present invention may be implemented on a variety of hardware platforms in addition to those illustrated in FIG. 1. FIG. 1 is presented as an example of a heterogeneous computing environment in which various embodiments of the present invention may be implemented, not as an architectural limitation of the present invention.

Although exemplary embodiments in this disclosure are described generally in terms of client-server architectures, that is not a limitation of the present invention. On the contrary, various embodiments of the present invention may be implemented, for example, in peer-to-peer architectures and in other computer architectural arrangements as will occur to those of skill in the art.

Figure 2:
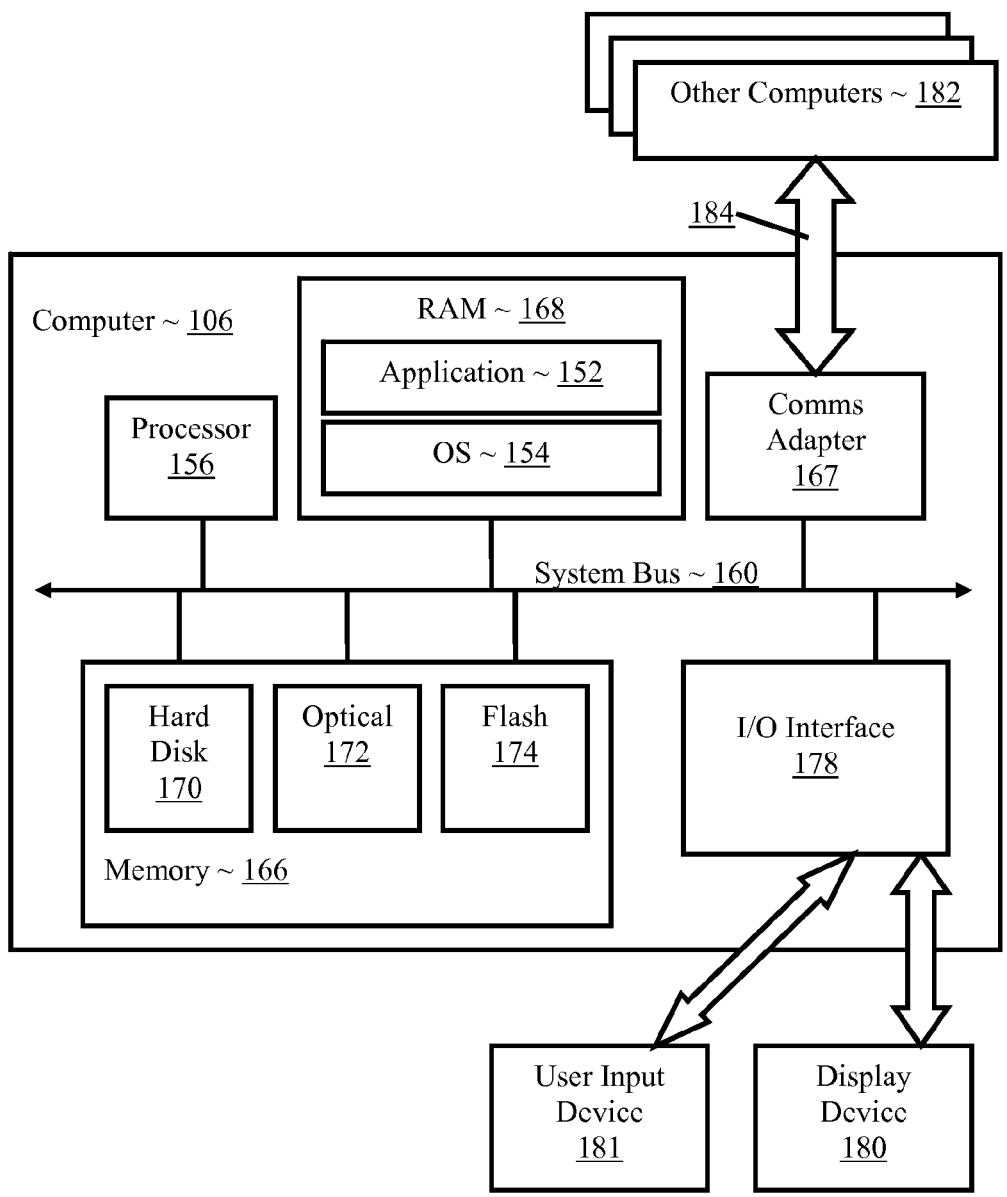
FIG. 2 sets forth a block diagram of automated computing machinery useful in systems for collaborative email according to embodiments of the present invention.

FIG. 2 sets forth a block diagram of automated computing machinery comprising a computer 106, such as a client device, email client, or server, useful in systems for collaborative email with delegable authorities according to embodiments of the present invention. The computer 106 of FIG. 2 includes at least one computer processor 156 or 'CPU' as well as random access memory 168 ("RAM"). Stored in RAM 168 is an application program 152. Application programs useful in implementing collaborative email with delegable authorities include Java servlets and CGI scripts running on servers and email clients on client machines. Also stored in RAM 168 is an operating system 154. Operating systems useful in computers according to embodiments of the present invention include Unix, Linux, Microsoft NT™, and others as will occur to those of skill in the art.

The computer 106 of FIG. 2 includes computer memory 166 coupled through a system bus 160 to the processor 156 and to other components of the computer. Computer memory 166 may be implemented as a hard disk drive 170, optical disk drive 172, electrically erasable programmable read-only memory space (so-called 'EEPROM' or 'Flash' memory) 174, RAM drives (not shown), or as any other kind of computer memory as will occur to those of skill in the art.

The example computer 106 of FIG. 2 includes communications adapter 167 that implements connections for data communications 184 to other computers 182, servers or clients. Communications adapters implement the hardware level of data communications connections through which client computers and servers send data communications directly to one another and through networks. Examples of communications adapters include modems for wired dial-up connections, Ethernet (IEEE 802.3) adapters for wired LAN connections, and 802.11b adapters for wireless LAN connections.

The example computer of FIG. 2 includes one or more input/output interface adapters 178. Input/output interface adapters in computers implement user-oriented input/output through, for example, software drivers and computer hardware for controlling output to display devices 180 such as computer display screens, as well as user input from user input devices 181 such as keyboards and mice.

Figure 3:
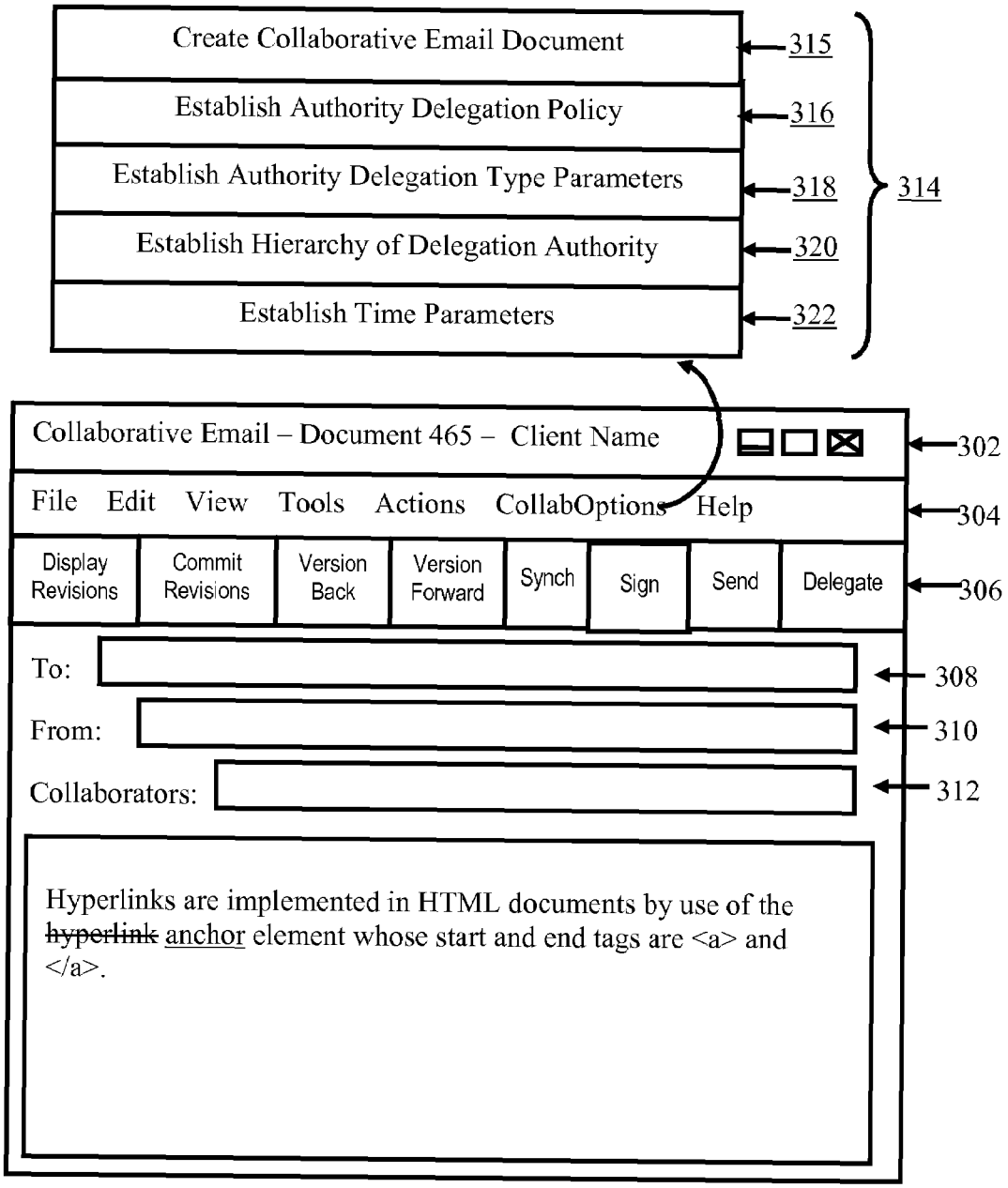
FIG. 3 sets forth a line drawing of a data entry screen on an email client improved according to embodiments of the present invention.

Exemplary embodiments of the present invention are further explained with reference to FIG. 3. FIG. 3 sets forth a line drawing of a data entry screen on an email client improved according to embodiments of the present invention. The data entry screen of FIG. 3 includes a title line 302 that displays the fact that the document under edit is a collaborative email document, the document identification ("465"), and the name of the email client ("Client Name"). In actual embodiments, the Client Name is the actual name of an email client such as Microsoft's Outlook™ or Qualcomm's Eudora™.

The data entry screen of FIG. 3 includes a horizontal pull-down menu 304 containing the usual menu items such as 'File,' 'Edit,' 'View,' and so on. The entry screen of FIG. 3 also includes a toolbar 306 that includes buttons titled 'Display Revisions,' 'Commit Revisions,' 'Version Back,' 'Version Forward,' 'Synch,' 'Sign,' 'Send,' and 'Delegate.' The email client of FIG. 3 is programmed to display revisions, or not, in response to operation of the 'Display Revisions' button in the toolbar 306. In the example of FIG. 3, the following text is displayed for collaborative email document 465:

Hyperlinks are implemented in HTML documents by use of the anchor element whose start and end tags are <a> and </a>.

In this example, 'Display Revisions' is set 'on,' and the email client therefore displays revisions representing deleting 'hyperlink' from row 2, column 1 and inserting 'anchor' at row 2, column 1. If 'Display Revisions' were set 'off,' the text under edit would be displayed as:

Hyperlinks are implemented in HTML documents by use of the anchor element whose start and end tags are <a> and </a>.

The email client of FIG. 3 is programmed so that in response to operation of the 'Commit Revisions' button in the toolbar 306, the email client encodes a current set of revisions of the copy of the document under edit on the client and sends them to a server. The server may be a web server, for example, making the revisions available for asynchronous delivery to other clients, or the server may be an instant messaging server, delivering the revisions synchronously to available clients. The encoding may be implemented, for example, as follows, for the exemplary revision described just above:

d 2 1 hyperlink
i 2 1 anchor where "d 2 1 hyperlink" encodes "delete the text 'hyperlink' beginning at row 2, column 1," and "i 2 1 anchor" encodes "insert the text 'anchor' beginning at row 2, column 1."

Figure 4:
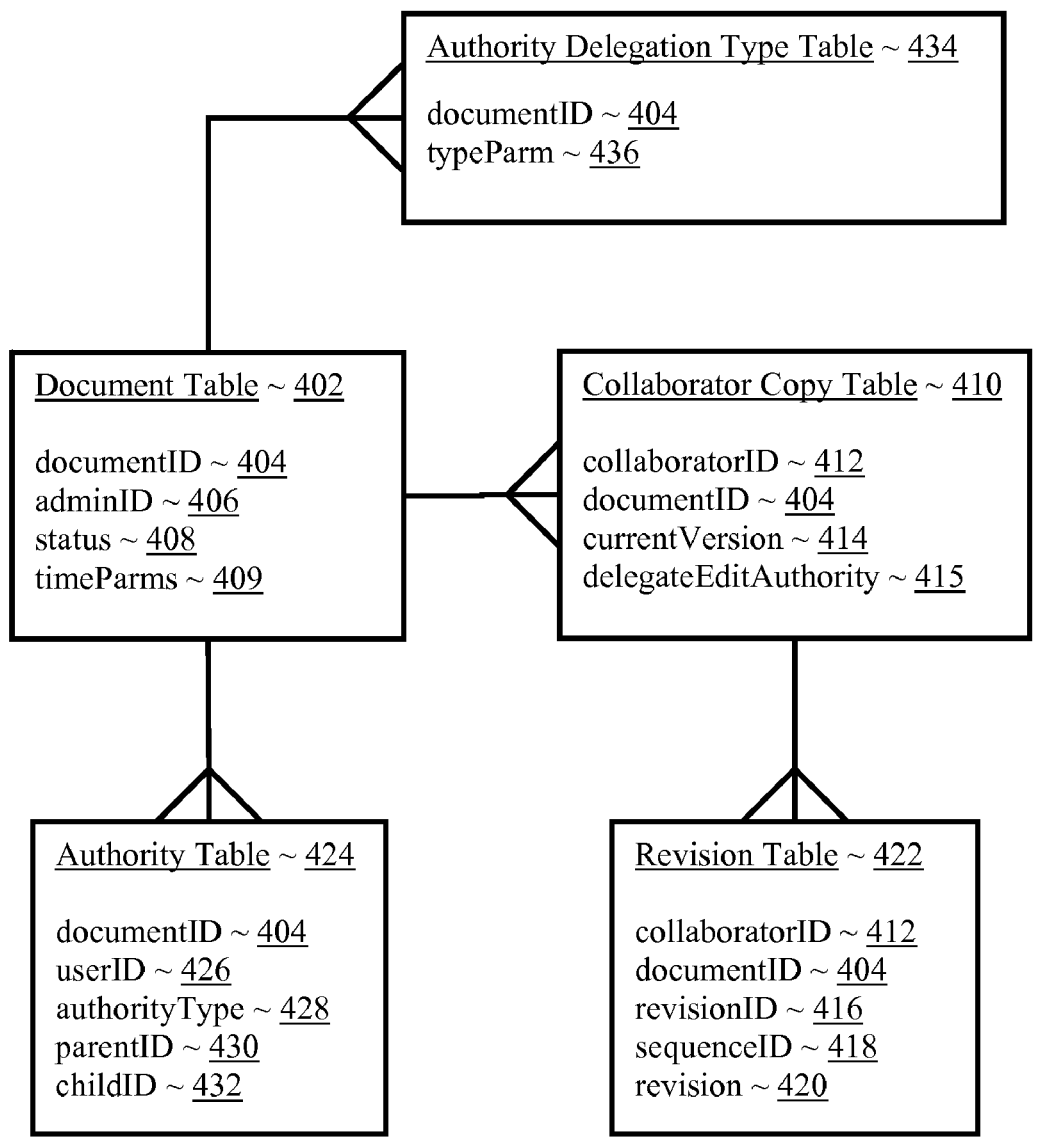
FIG. 4 sets forth a database diagram of exemplary data structures useful in various embodiment of the present invention.

On a server, revisions so encoded may be stored in data structures such as those shown in FIG. 4. FIG. 4 shows a database diagram in which records in a document table 402 are related one-to-many to records in a collaborator copy table 410 which are in turn related one-to-many to records in a revision table 422. Each record in the document table 402 represents a collaborative email document having an administrative copy and one or more collaborators' copies. Each record in the document table includes a document identification field 404, an identification of the administrator for the document 406, and a status field 408 for the document. The status field may be used, for example, to note that the document has been created but not yet distributed to collaborators, is presently under edit by collaborators, or is disabled for editing while it is made available for signing by signatories.

Each record in the collaborator copy table 410 represents a copy of a collaborative email document provided to a collaborator for viewing and editing. Each record in the collaborator copy table 410 includes an identification 412 of the collaborator to whom a copy was provided. The collaborator identification 412 may be implemented as, for example, a collaborator's email address. Each collaborator copy record 410 also includes a document identification field 404 identifying the document a copy of which was provided to the collaborator.

Each collaborator copy record 410 in this example also includes an identification of the current version 414 of the document currently provided as a copy to the collaborator. Updating copies of collaborative email documents on collaborators' clients with revisions is typically carried out by updating a copy of the document with all revisions later than a current version identifier for the copy, and the repository of the current version identifier for the copy is often a server-side data structure such as the one shown in FIG. 4. Storing a copy's current version identification server-side generally means that an update request message from a client need specify only the collaborator identification 412 and the document identification 404. That is, the update request message need not necessarily include the current version number of the collaborative email on the client because the server tracks the version identification 414 for that collaborator's copy of that document and can infer it from the collaborator identification and the document identification. The server then is programmed to respond to such an update request message with a response message transmitting all the revisions later than the current revision number for the copy identified in the request message—and then updating the current version identification 414 to the current version number. This process is referred to generally in this specification as full synchronization, a process often supported in email clients improved according to embodiments of the present invention by a 'Synch' button, for example, such as the one shown in the exemplary toolbar 306 for the email client of FIG. 3.

An alternative request message requests less than a full synchronization, such as, for example, the revisions comprising just the next version, or the revisions comprising a previous version. That is, email clients according to embodiments of the present invention are typically programmed to operate in response to, for example, a 'Version Forward' button, such as the one shown in the example toolbar 306 on FIG. 3, by transmitting to a server a request for the revisions comprising the next version. 'Next version' means the version just after the version currently identified in a server-side current version identification such as the one at reference 414 on FIG. 4. The server then is programmed to respond to such an update request message with a response message transmitting only the revisions identified by the next version number for the copy identified in the request message—and then updating the current version identification 414 to the next version number. Once again, in this method, the email client does not need to advise the server of its current version; the server knows. The request message need only identify itself as a 'next version only please' message type and provide the collaborator identification 412 and the document identification 404 for the pertinent collaborative document.

Similarly, email clients according to embodiments of the present invention are typically programmed to operate in response to a 'Version Back' button, such as the one shown in the example toolbar 306 on FIG. 3, by transmitting to a server a request for the revisions comprising the previous version. 'Previous version' means the version just before the version currently identified in a server-side current version identification such as the one at reference 414 on FIG. 4. The server then is programmed to respond to such an update request message with a response message transmitting only the revisions identified by the previous version number for the copy identified in the request message—and then updating the current version identification 414 to the previous version number. Once again, in this method, the email client does not need to advise the server of its current version; the server knows. That is, the server knows the current version because the current client revision number is stored on the server when it provides the version to the client, and when the client requests a previous or next version, the server decrements or increments the version number and sends the specified version to the client. The request message therefore need only identify itself as a 'previous version only please' message type and provide the collaborator identification 412 and the document identification 404 for the pertinent collaborative document.

Each record in the revision table 422 represents a revision to a collaborative email document. In addition to the revision itself 420, which may be string-encoded as described above, each revision record 422 also includes a collaborator identification 412 of the collaborator who created a revision, a document identification 404 of the document for which the revision is intended, a revision identification 416, and a sequence identification 418 for ordering revisions within a version.

As mentioned above, email clients according to embodiments of the present invention are typically programmed so that in response to operation of a 'Commit Revisions' button in a toolbar like the one shown at reference 306 on FIG. 3, the email client encodes a current set of revisions of the copy of the document under edit on the client and sends them to a server. Such a set of revisions, upon arriving at a server, is given a revision identification code 416, which may be implemented, for example, as a sequential integer, 1, 2, 3, and so on. The version identification code (or 'version number') identifies a set of revisions from a particular collaborator, when used in correct order to update copies of the document, as implementing a particular version of the document.

In typical embodiments, the email client may be programmed to provide a sequence number for each revision identifying the correct order in which the revisions are to be used to update copies of a collaborative email document. It is clear that the exemplary revisions mentioned above:

d 2 1 hyperlink
i 2 1 anchor could not be performed meaningfully in reverse order because after inserting 'anchor' at row 2, column 1, an email client could not then delete 'hyperlink' from the same location. This explains the usefulness of the sequence identification code shown at reference 418 on FIG. 4.

In the exemplary data structures of FIG. 4, the records in document table 402 are related one-to-many to records in an authority table 424. Each record in the authority table 424 identifies a user, a collaborator or a user, who eligible to be a delegate or assignee of authority to sign, view, or edit a collaborative email document. Each record in the authority table includes a document identification field 404 that acts as a foreign key to the document table 402. Each record in the authority table includes a user identification 426 of a signatory or collaborator who is eligible to have delegated the authority to sign, view, or edit the collaborative email document identified in the document identification field 404. Each record in the authority table includes an authority type field 428 that identifies the kind of authority for which the user is eligible to be a delegate. Useful values for the authority type field may include, for example. 'SIGN' for signature authority, 'VIEW' for collaborative authority to view without editing, and 'EDIT' for collaborator authority to edit a collaborative email document.

Each record in the authority table also includes a parent identification field 430 and a child identification field 432 that may be used as pointers to a parent record and to a child record in forming a hierarchy of delegation authority, either for signature authorities or for authority to view and edit. In a tree type hierarchy, for example, the value of the parent identification field may be set to 'ROOT' to identify the top of a hierarchy, and the child identification field 432 may be implemented as a list so that tree nodes may have more than one branch. In authority table records representing branch nodes in such a tree type hierarchy, the parent identification field points to the user identification of a node just above the branch in the hierarchy and the child identification field can point to a node or nodes just below. In leaf nodes, the child identification field can be left null. In this way, a tree type hierarchy of delegation authority can be formed. The use of a tree type hierarchy in this example is for explanation, not for limitation. Hierarchies of delegation authority may be formed in other ways as will occur to those of skill in the art, and all such ways are well within the scope of the present invention.

Figure 5:
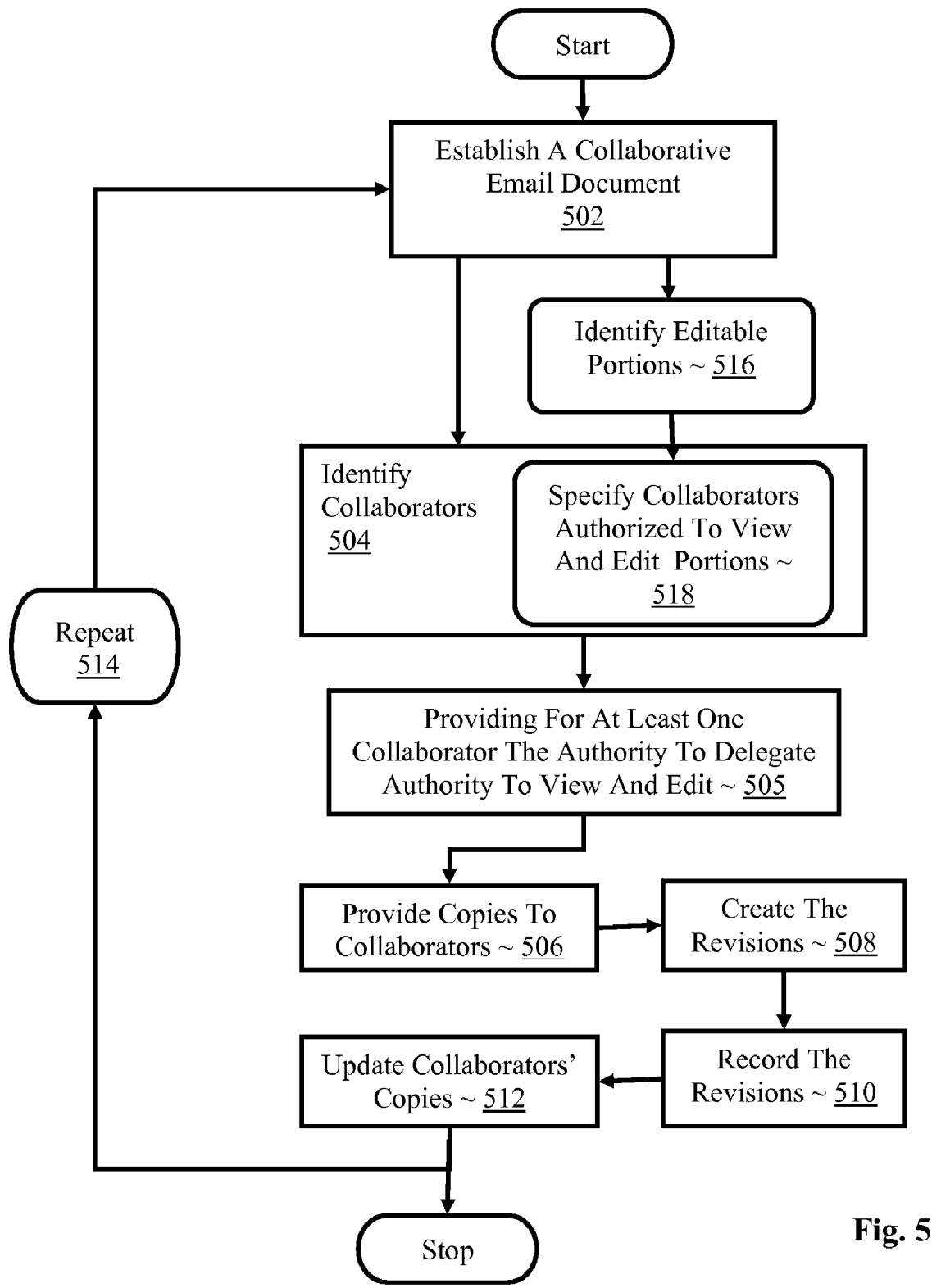
FIG. 5 sets forth a flow chart depicting a method for writing a collaborative email document.

Methods for writing collaborative email documents with delegable authorities according to embodiments of the present invention are further explained with reference to FIG. 5. FIG. 5 sets forth a flow chart depicting a method for writing a collaborative email document with delegable authorities, where the method includes establishing 502 a collaborative email document on an administrator's client. The method of FIG. 5 also includes identifying 504 one or more collaborators who are authorized to view and edit the document as it is being written. The collaborators may be any email users, including signatories and an administrator for the document.

Establishing 502 a collaborative email document on an administrative client may be carried out by opening a new email document, identifying the document as a collaborative one, and identifying an administrator for the document. In typical embodiments, establishing a collaborative email document includes retaining an administrative copy of the document on an administrative client while the document is written by one or more collaborators.

It is useful to understand that an administrative copy of a collaborative email document according to embodiments of the present invention is not a master document according to prior art. In fact, according to embodiments of the present invention, there is no 'master copy' of a collaborative document against which revisions are recognized. All copies, including an administrative copy, here have the same status and eligibility for viewing, editing, and updating. In fact, if an administrator is also an authorized collaborator, then all copies are identical, and the only thing that distinguishes the administrator's copy is that eventually its administrative client will acquire an enabled 'send' function, while none of the other clients ever will.

In the present invention, there is no limitation regarding the initial contents of a collaborative email document. The user who creates a document, typically the user to be identified as the administrator for the document, may be an author, writing a first draft, so that the initial content is substantial. Alternatively, the administrator may be a clerk who creates on behalf of a supervisor a completely blank document to be written entirely by its collaborators.

Identifying collaborators and administrators may be carried out by including identifiers for them in meta data in an email document implemented in HTML format, for example, as shown here:

```
<HTML>
    <HEAD>
        <META name="Document Type"
            content="Collaborative Email">
        <META name="Revision Number" content="1">
        <META name="adminID"
            content="MaryJohnson@us.ibm.com">
        <META name="collaboratorID"
            content="MaryJohnson@us.ibm.com
            PeteJones@us.ibm.com JohnSmith@us.ibm.com">
        <META name="RevisionAuthority"
            content="MaryJohnson@us.ibm.com ALL
                PeteJones@us.ibm.com Segment1
                JohnSmith@us.ibm.com Segment2">
        <META name="DelegateEditAuthority"
            content="MaryJohnson@us.ibm.com
                PeteJones@us.ibm.com">
    </HEAD>
    <BODY>
        <SEGMENT1> </SEGMENT1>
        <SEGMENT2> </SEGMENT2>
    </BODY>
</HTML>
```

In this example, a metadata element named "Document Type" is used to identify an email document as a collaborative one. A metadata element named "Revision Number" is used to store the current revision identification of each copy of the document. The "Revision Number," although typically stored server-side also, may advantageously be recorded in the metadata for each copy of a collaborative document because each collaborator's copy and the administrative copy may embody different versions of the document at the same time.

In the exemplary metadata, a metadata element named "adminID" records the identity of the administrator of the document as "MaryJohnson@us.ibm.com." The administrator identification, although typically stored server-side also, may advantageously be recorded in the metadata for each copy of a collaborative document so that the email client where the copy is revised by a collaborator or an administrator can know whether that particular email client is the administrative client for that document.

The method of FIG. 5 includes providing 505 for at least one collaborator the authority to delegate the authority to view and edit the collaborative email document. In the exemplary HTML set forth above, the metadata element named "DelegateEditAuthority" identifies Mary Johnson and Pete Jones as collaborators having the authority to further delegate the authority to view and edit the collaborative email document. Alternatively or additionally, authority to delegate the authority to view and edit a collaborative email may be effected server-side, for example, by use of a Boolean field in a data record representing a collaborator, such as the field named 'delegateEditAuthority' shown at reference 415 in the exemplary data structure for the collaborator copy table 410 in FIG. 4. In such a system, authority for Mary Johnson and Pete Jones to delegate the authority to view and edit a collaborative email document would be effected by setting to 'TRUE' the delegateEditAuthority fields in the two collaborator copy table 410 records bearing in their collaboratorID fields 412 collaborator identifications for Mary Johnson and Pete Jones respectively.

In the HTML example set forth above, a metadata element named "collaboratorID" records the identities of the collaborators authorized to view and edit the document in the process of writing the document. The method of FIG. 5 also includes providing 506 to the collaborators copies of the document for viewing and editing, and the collaborators' copies typically reside on collaborators' clients while the document is being written. In the metadata example, Mary Johnson, the administrator for the document, is also identified as a collaborator, which is optional. Providing copies to collaborators may be implemented by emailing copies from the administrative client to the collaborators. The 'From:' (field 310 on FIG. 3) in email clients according to embodiments of the present invention is often reserved for the identification of signatories, and communications of revisions among collaborators are carried out synchronously or asynchronously as described in this specification. It is possible, therefore, if an administrator is not listed as a collaborator, that none of the collaborators will ever know or care who the administrator is.

The method of FIG. 5 includes creating 508 revisions in at least one copy of the document. Revisions are created by recording changes in a document effected by the usual email client document editor and encoding them as described above: "d 5 12 hyperlink," "I 5 12 anchor," and so on, for example.

The method of FIG. 5 includes recording 510 the revisions. Recording is often carried out by storing them temporarily on the email client until the collaborator making revisions arrives at a point where it is desirable to record them on the server as a version. In email clients according to embodiments of the present invention, a 'commit revisions' function is programmed to transmit to a server a set of revisions whose implementation represents a version. That is, in the method of FIG. 5, recording revisions 510 may be implemented by storing the revisions on a server accessible to collaborators' clients. Many such email clients provide a toolbar button or other user interface control such as the 'Commit Revisions' button in the toolbar at reference 306 on FIG. 3 programmed to transmit to a server a set of revisions for a version. Such a transmission of revisions is not a normal email function of SMTP or POP, for example. Instead, according to embodiments of the present invention, such transmissions are effected by use of TCP/IP, HTTP, or some other data communications protocol as will occur to those of skill in the art.

In the method of FIG. 5, recording revisions typically includes storing the revisions with a version identification for each revision. Storing revisions with versions identifications may be carried out by storing the version identifications in a server-side data structure such as that shown at reference 416 on FIG. 4. Similarly, in the method of FIG. 5, recording revisions often also includes storing the revisions with a sequence identification for each revision, so that the revisions can be sorted or indexed within a version. Storing revisions with sequence identifications may be carried out by storing the sequence identifications in a server-side data structure such as that shown at reference 418 on FIG. 4. Persons of skill in the art will recognize that implementing a data structure like the revision table 422 of FIG. 4 with a revision identification 416 and a sequence identification 418 creates a unique compound key into the revisions records comprising the revision identification and the sequence identification in combination. In such embodiments, the sequence identification may be a sequential integer, unique within a revision, non-unique across revisions, so that a unique key that includes the sequence identification also includes the revision number. Alternatively, the sequence identification may be a time stamp that identifies the date and time when each revision is made. Even a time stamp can be ambiguous across revisions, however, so that a unique key that includes a time stamp as sequence identification also advantageously includes the revision number.

The method of FIG. 5 includes updating 512 the copies of the document on collaborators' clients with the revisions. Revisions created on a collaborator's client may be considered already incorporated into the document copy on that client, and the revision number on the client side may be updated accordingly, for example:

<META name="Revision Number" content="2">

Similarly, in response to the data communications transmission carrying the revisions of a version to a server, a server using server-side data structures like those of FIG. 4 is programmed to update the pertinent collaborator copy record 410 with a new version number 414 for the collaborator copy where the new version was created. Such a server then creates a revision record 422 for each revision comprising the new version of the document.

Updating other collaborators' copies is then carried out by request/response communications between the collaborators' clients and the server. A collaborator client sends an HTTP request message for an update, either an update to the next version after the one presently installed on the client or a request for a full update all the way from the client's current version to the latest version available. A request for a full update all the way from the client's current version to the latest version available is called a synchronization request. The email client of FIG. 3, for example, is programmed to transmit a request for a next version in response to operation of the 'Version Forward' button in its toolbar 306. The email client of FIG. 3 is also programmed to transmit a request for a full update all the way from the client's current version to the latest version available in response to operation of the 'Synch' button in its toolbar 306.

In addition to requesting a next version and full synchronization, a client can also request a previous version. When a server receives such a request, the server provides in a response message the revisions defining a previous version, and the requesting email client implements those revisions in reverse order, thereby creating on that email client a previous version of the document. The email client of FIG. 3, for example, is programmed to transmit a request for a previous version in response to operation of the 'Version Back' button in its toolbar 306.

Methods of collaborative email with delegable authorities as illustrated in FIG. 5 also often include identifying 516 editable portions of a collaborative email document. In such methods, identifying 504 one or more collaborators typically also includes specifying 518 that only certain collaborators are authorized to view and edit one or more portions of the document. In such methods, authority to view and edit one or more portions of the document often includes authority to delegate to another collaborator the authority to view and edit one or more portions of the document. Such authority to delegate the authority to view and edit one or more portions of the document may be defined as part of the authority to view and edit, or it may be separately effected in metadata in a document template or in separate server-side data as described above in connection with the discussion of the 'delegateEditAuthority' field 415 on FIG. 4.

Identifying 516 editable portions of a collaborative email document may be implemented by use of templates or by inserting markup identifying the editable portions. Moreover, authorization for only certain collaborators to edit one or more portions of the document advantageously may be recorded in the document itself—or in each copy of the document—so that such limitations on authorization are easily available to each collaborator's email client. In the following exemplary email document implemented in markup format, for example:

```
<HTML>
    <HEAD>
        <META name="RevisionAuthority"
            content="MaryJohnson@us.ibm.com ALL
                PeteJones@us.ibm.com Segment1
                JohnSmith@us.ibm.com Segment2">
    </HEAD>
    <BODY>
        <SEGMENT1> </SEGMENT1>
        <SEGMENT2> </SEGMENT2>
    </BODY>
</HTML>,
``` editable portions of a document are identified, in the document itself, by the markup elements <SEGMENT1> </SEGMENT1><SEGMENT2></SEGMENT2>. Specifying 518 that only certain collaborators are authorized to view and edit one or more portions of the document in this example is carried out by use of the metadata:

```
<META name="RevisionAuthority"
    content="MaryJohnson@us.ibm.com ALL
        PeteJones@us.ibm.com Segment1
        JohnSmith@us.ibm.com Segment2">,
``` which specifies that Mary Johnson is authorized to view and edit the entire document, Pete Jones is authorized to view and edit Segment 1, and John Smith is authorized to view and edit Segment 2.

Figure 6A:
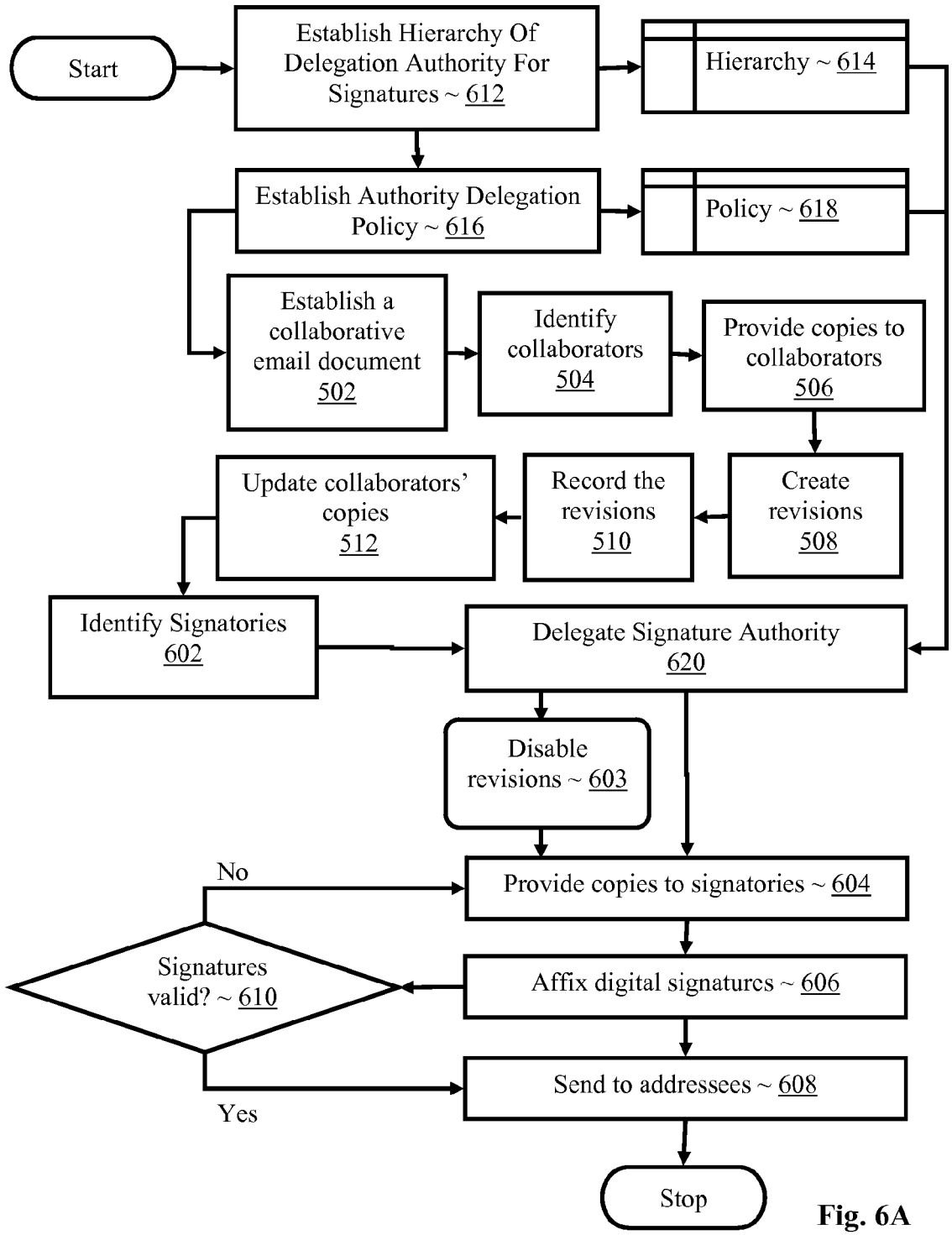
FIGS. 6A, 6B, and 6C set forth flow charts illustrating extensions of the method of FIG. 5.

For further explanation, FIG. 6A sets forth a flow chart illustrating an extension of the method of FIG. 5. That is, the method of FIG. 6A includes establishing a collaborative email document 502, identifying collaborators 504, and so on, as in the method of FIG. 5. In addition, however, the method of FIG. 6A includes establishing 612 a hierarchy 614 of delegation authority for signatures; establishing 616 at least one authority delegation policy 618 that includes rules for automated delegation of signature authority among signatories in the hierarchy; and delegating 620 signature authority from at least one signatory to another signatory in accordance with the authority delegation policy. It is useful to note that not all embodiments of the present invention that include delegating signature authority require a hierarchy of delegation authorities to do so. Delegations of signature authority may advantageously and alternatively be made from a flat list, from linked lists, from direct user input in response to a prompt requesting identification of delegates, and so on, as will occur to those of skill in the art.

Establishing 614 a hierarchy of delegation authority for signatures may be carried out, for example, by use of data structures such as those exemplified in FIG. 4. Using an email client program adapted according to embodiments of the present invention, a user may establish 614 a hierarchy of delegation authority 614 by operating a user interface such as the one on the exemplary email client illustrated in FIG. 3 by, for example, selecting the 'CollabOptions' button on toolbar 304 and then selecting the 'Establish Hierarchy Of Delegation Authority' entry 320 from the resulting pop-up menu 314. Selecting the 'Establish Hierarchy Of Delegation Authority' entry 320 in turn presents a data entry screen (not shown) through which a user may enter records in a records in an authority table such as the one illustrated, for example, at reference 424 on FIG. 4. As mentioned above, records in an authority table 424 may be used to identify a user, a collaborator, a signatory, or another user, who is eligible to be a delegate or assignee of authority to sign a collaborative email document. Such records 424 may include a document identification field 404 as a foreign key to a document table 402. Each record in the authority table may include a user identification 426 of a signatory or collaborator who is eligible to have delegated the authority to sign the collaborative email document identified in the document identification field 404. Each record in the authority table may include an authority type field 428 that identifies the kind of authority for which the user is eligible to be a delegate—in this example, signature authority rather than edit authority or authority to view. Such records may include a parent identification field 430 and a child identification field 432 as pointers to a parent record and to one or more child records forming a hierarchy of delegation authority for signature authority.

Establishing 616 an authority delegation policy 618 that includes rules for automated delegation of signature authority among signatories in the hierarchy may be carried out by establishing such rules for automated delegation of signature authority in a rules base, database, or other data structure available on-line at run time to email clients adapted according to embodiments of the present invention. Using an email client program adapted according to embodiments of the present invention, a user may establish 616 an authority delegation policy 618 that includes rules for automated delegation of signature authority among signatories in the hierarchy by operating a user interface such as the one on the exemplary email client illustrated in FIG. 3 by, for example, selecting the 'CollabOptions' button on toolbar 304 and then selecting the 'Establish Authority Delegation Policy' entry 316 from the resulting pop-up menu 314. Selecting the 'Establish Authority Delegation Policy' entry 316 in turn presents a data entry screen (not shown) through which a user may enter rules for automated delegation of signature authority that operate together as an authority delegation policy. Examples of rules forming an authority delegation policy include the following:

a rule that the signature authority of a first signatory having a first position in a hierarchy of delegation authority may be delegated to a second signatory having a second position in the hierarchy of delegation authority, where the second position is higher in the hierarchy than the first position;

a rule that a first signatory having a first position in the hierarchy of delegation authority may digitally sign the collaborative email document only after a second signatory having a second position in the hierarchy of delegation authority has signed the collaborative email document, where the second position is higher in the hierarchy than the first position;

a rule that signature authority is to be delegated to a second signatory if a first signatory does not sign the document within a specified period of time; and a rule that signature authority may be delegated during a specified period of time.

The preceding ruleset is exemplary and non-exclusive. Other rules as will occur to those of skill in the art may be used to make up an authority delegation policy and all such rules are well within the scope of the present invention.

The method of FIG. 6A includes identifying 602 one or more signatories for the document. Identifying the signatories may be implemented by programming an email client, such as the one shown in FIG. 3, to accept as input through its 'From:' field 310 more than one entry of signatory identification, JaySchwarz@us.ibm.com, MikeWilliams@us.ibm.com, and so on, and treat each of them as a signatory. In such embodiments, there is no limitation regarding when the signatories are to be identified. That is, they may be identified when the document is first created by an administrator, or later, after all the collaborators are finished revising the document. In this sense, a collaborative email document according to the present invention is different from ordinary emails in that it may arrive in the in-boxes of collaborators with no entry in its 'From:' field, because, for example, no one has yet decided who must authorize the ultimate promulgation of the document to addressees. Consider an email announcement of a new corporate policy to be sent to hundreds of addressees. The email is created by a clerk in a corporate planning department and revised by several collaborators. Then later, after the collaborators are satisfied with the contents of the document, it is decided whether the president of the company will sign it and whether one or more vice presidents will sign it.

Delegating 620 signature authority from at least one signatory to another signatory in accordance with an authority delegation policy 618 may be carried out as identifications of additional signatories, that is, by programming an email client, such as the one shown in FIG. 3, as described above, to accept as input through its 'From:' field 310 additional entries of signatories with newly delegated signature authority. Such delegations of signature authority may occur at almost any time during development of a collaborative email document. That is, signature authority may be delegated when the document is first created by an administrator or later during the writing of the document, when, for example, a collaborator or a signatory having authority to make delegations delegates signature authority to one or more new signatories.

Delegations may be cumulative or exclusive. That is, in some systems according to embodiments of the present invention, a delegation of signature authority from one signatory to another is implemented to eliminate the first signatory's signature authority. In other systems according to embodiments of the present invention, a delegation of signature authority from one signatory to another is cumulative, both signatories now have signature authority. And some systems do both, identifying whether delegations are cumulative or exclusive with a parameter in a data structure such as those illustrated on FIG. 4.

The method of FIG. 6A includes providing 604 to each signatory, including newly delegated signatories, a copy of the document for signing. To the extent that signatories are also collaborators, they may already have copy of the document, and they may affix their signatures as soon as revisions are concluded. Signatories who are not collaborators may be emailed a copy of the document, typically from the administrator, to obtain their signatures. In the email client of FIG. 3, for example, the toolbar 306 includes a button labeled 'Sign,' where the email client is programmed to email the document to signatories. It is common in embodiments of this invention that the 'Sign' button, the ability to send a document to a signatory, is only enabled on the administrator's email client, so that there is administrative control over the process of affixing signatures to the document.

The method of FIG. 6A includes affixing 606 to the document a digital signature for each signatory. In this context, 'signature' generally refers to a digital signature. A digital signature is a data structure containing a hashed digest of the contents of a collaborative email document encrypted with a signatory's private key from a public/private key pair of an asymmetric cryptosystem. Email clients generally are equipped with the ability to affix digital signatures to email documents. In Microsoft Outlook™, for example, a digital signature function is available, when an email document is open for editing, through the pull-down menus at View/Options/Security.

Checking validity of a digital signature is accomplished by decrypting the hashed digest from the signature with a signatory's public key, hashing a new digest of the current contents of the document, and comparing the new digest with the decrypted digest from the signature. If the new digest and the decrypted digest from the signature are identical, the signature is considered valid. They will not be identical if revisions to the document are entered after the signature is affixed to the document.

When the document is provided 604 to signatories for signing, therefore, in many embodiments of the present invention, the document advantageously is first disabled 603 for revision. A document may be disabled for revisions, for example, by encoding that fact in a data element dedicated to that purpose, such as, for example, the 'status' field 408 in the exemplary data structures of FIG. 4. Such a status field may be given a value such as 'LOCKED,' for example, and a server supporting the revision table may then be programmed to exclude or reject revisions received from collaborators while the document is so locked.

Some embodiments do not implement disabling of revisions during signing. In some embodiments that do implement disabling of revisions during signing, a signatory who is also a collaborator may go ahead and affix a signature that may be rendered invalid by a later revision. In such embodiments, as shown in FIG. 6A, methods for collaborative email advantageously may include determining 610 whether the digital signatures in a document are valid, and, if they are not, providing 606 the document again to one or more signatories for re-signing. In this way, a method such as the one illustrated by FIG. 6A may send a collaborative email document from an administrative client to addressees only when the document bears valid digital signatures from all signatories.

The method of FIG. 6A includes sending 608 the signed document from the administrative client to addressees. Unlike ordinary emails, the 'From:' field in a collaborative email arriving at addressees' in-boxes identifies the signatories of the document rather than its actual sender. The actual sender is typically an administrator who may or may not be known to the addressees. In this context, what the 'From:' field communicates is that the contents of the document are communicated to its addressees with the authority of the signatories.

At this point in processing, the identities of the administrator and the collaborators may be of little concern to the addressees. The collaborators often in effect develop a document for mailing on behalf of signatories who have authority over the subject matter of the document. It is therefore the identity of the signatories rather than the identify of the developers of the document that will often be considered more pertinent to addressees. The collaborators, the administrator, and the signatories may or may not be among the addressees.

Figure 6B:
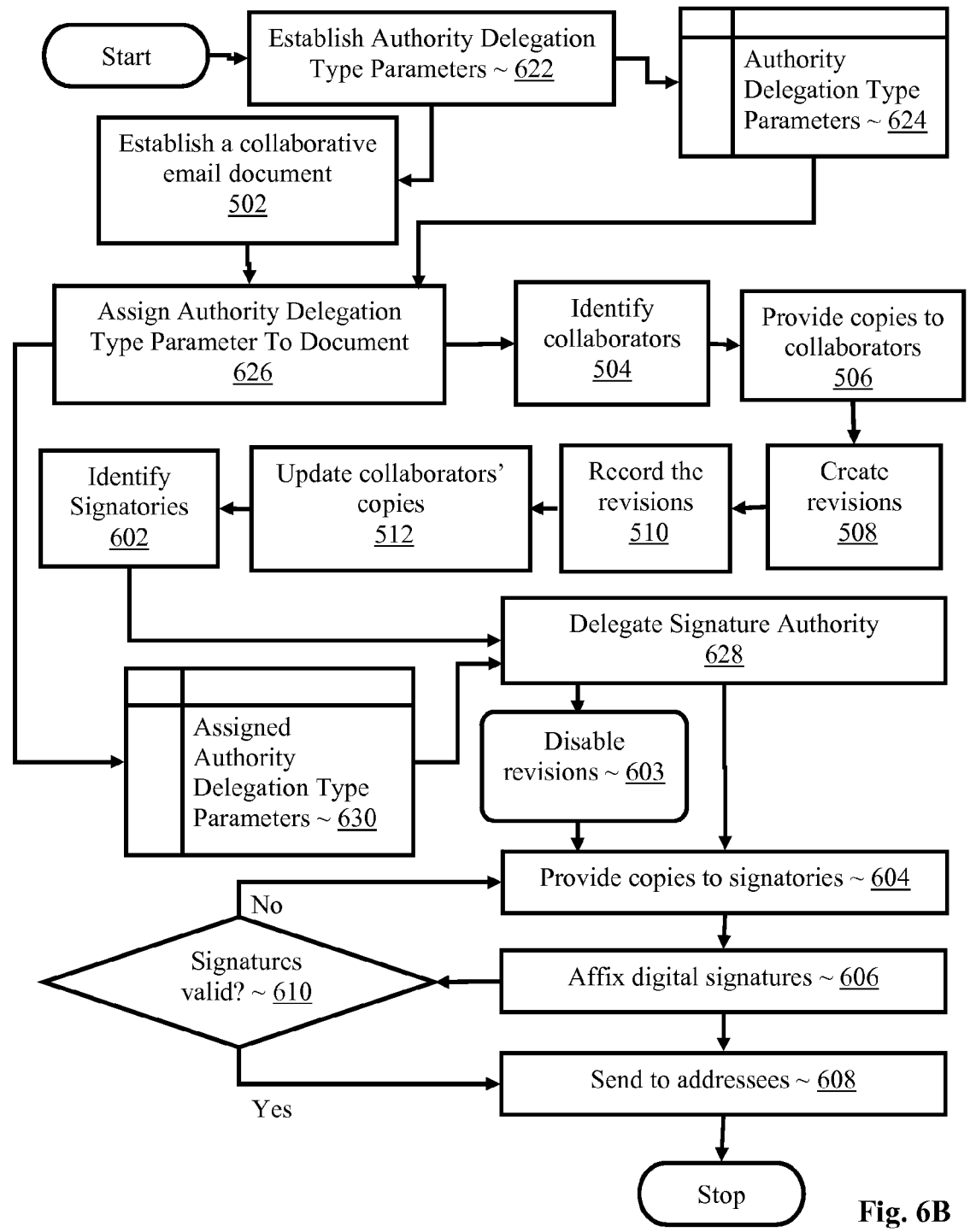

For further explanation, FIG. 6B sets forth a flow chart illustrating an extension of the method of FIG. 5. That is, the method of FIG. 6B includes establishing a collaborative email document 502, identifying collaborators 504, and so on, as in the method of FIG. 5. In addition, however, the method of FIG. 6B includes establishing 622 one or more authority delegation type parameters 624 that identify modes of delegating authority for signatories; assigning 626 at least one authority delegation type parameter 624 to the collaborative email document; and delegating 628 signature authority from at least one signatory to another signatory in accordance with the assigned authority delegation type parameter 630. Establishing one or more authority delegation type parameters that identify modes of delegating authority for signatures is implemented, for example, by a software developer, system developer, or system administrator configuring an email client or server according to embodiments of the present invention with one or more supported authority delegation type parameters identifying supported modes of delegating authority. A supported mode is one that the email client and server are programmed to effect.

Delegation type parameters and the modes of delegation they identify may include the following, for example:
  _NO_DELEGATION—meaning that no further delegation of signature authority is permitted after an originator or administrator initially identifies signatories
  _BY_POLICY—meaning that delegation is to be carried out according to an authority delegation policy, cumulatively with other modes of delegation
  _BY_POLICY_ONLY—meaning that delegation is to be carried out exclusively according to an authority delegation policy, to the exclusion of other modes of delegation
  _BY_ORIGINATOR—meaning that delegation may be carried out by the originator of the collaborative email document, cumulatively with other modes of delegation
  _BY_ORIGINATOR_ONLY—meaning that delegation may be carried out only by the originator of the collaborative email document, to the exclusion of other modes of delegation
  _BY_ANY_CONTRIBUTOR— meaning that signature authority may be delegated by any contributor
  _BY_SPECIFIED_CONTRIBUTORS—meaning that signature authority may be delegated by one or more specified contributors
  _BY_ANY_SIGNATORY—meaning that signature authority may be delegated by any signatory
  _BY_SPECIFIED_SIGNATORIES—meaning that signature authority may be delegated by one or more specified signatories This description of modes of delegation and the parameters identifying them is presented for explanation of exemplary embodiments, not for limitation. Other modes of delegation and other delegation type parameters may occur to those of skill in the art, and the use of all such modes of delegation and all such delegation type parameters are well within the scope of the present invention.

Assigning 626 an authority delegation type parameter 624 to a collaborative email document is implemented, for example, by providing data entry features in an email client according to embodiments of the present invention such as that illustrated by the 'CollabOptions' menu item in the horizontal menu 304 on FIG. 3, which, when invoked, presents pop-up menu 314 which in turn presents menu item 318 for assigning an authority delegation type parameters to the collaborative email document under edit. Invoking menu item 318 for assigning an authority delegation type parameter provides a further pop-up selection list or data entry tool (not shown) through which authority delegation type parameters supported in the email client may be entered for use in the current document—entered, that is, into a data structure of the kind illustrated, for example, as an Authority Delegation Type Table 434 on FIG. 4. The Authority Delegation Type Table 434 includes a document identification field 404 that functions as a foreign key to the document table 402, thereby associating one or more authority delegation type parameters 436 with a particular collaborative email document.

Using an email client program adapted according to embodiments of the present invention, a user may establish 614 a hierarchy of delegation authority 614 by operating a user interface such as the one on the exemplary email client illustrated in FIG. 3 by, for example, selecting the 'CollabOptions' button on toolbar 304 and then selecting the 'Establish Hierarchy Of Delegation Authority' entry 320 from the resulting pop-up menu 314. Selecting the 'Establish Hierarchy Of Delegation Authority' entry 320 in turn presents a data entry screen (not shown) through which a user may enter records in a records in an authority table such as the one illustrated, for example, at reference 424 on FIG. 4.

Delegating 628 signature authority from at least one signatory to another signatory in accordance with an assigned authority delegation type parameter 630 is carried out in this example by an authorized user's invoking the 'Delegate' button on toolbar 306 on the email client illustrated on FIG. 3. In this example, the 'Delegate' function is programmed to delegate signature authority according to authority delegation type parameters assigned to the document and the modes of delegation they identify. That is, is the _NO_DELEGATION parameter is assigned to the document, no delegation is permitted; if the _BY_POLICY parameter is assigned to the document, delegation is carried out according to an authority delegation policy cumulatively with other modes of delegation; if the _BY_POLICY_ONLY parameter is assigned to the document, delegation is carried out only according to an authority delegation policy exclusively with respect to other modes of delegation; and so on according to which authority delegation type parameters are assigned to the document under edit.

Figure 6C:
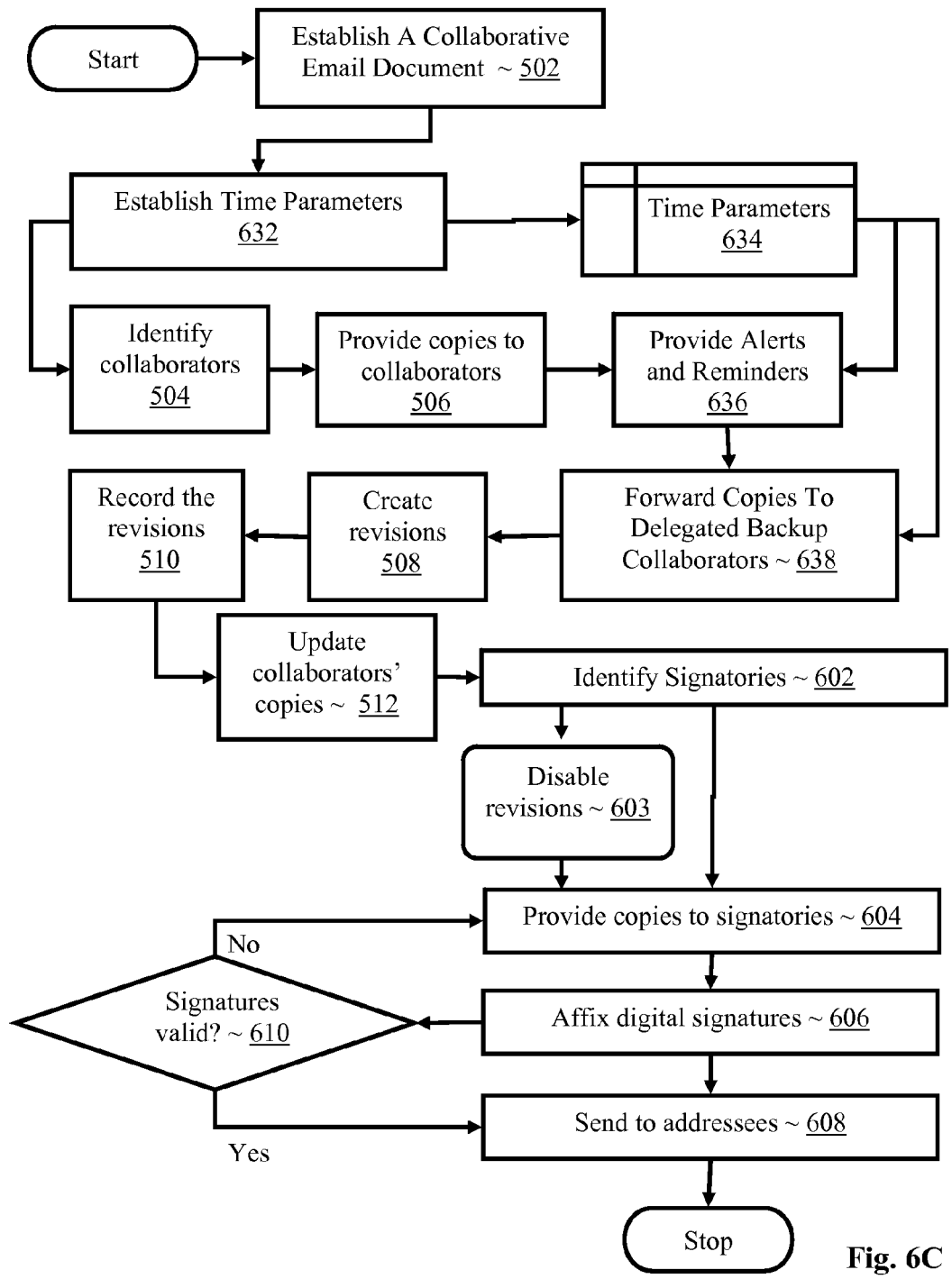

For further explanation, FIG. 6C sets forth a flow chart illustrating an extension of the method of FIG. 5. That is, the method of FIG. 6C includes establishing a collaborative email document 502, identifying collaborators 504, and so on, as in the method of FIG. 5. In addition, however, the method of FIG. 6C includes establishing 632 time parameters 634 for writing the collaborative email document; providing 636 reminders and alerts in accordance with the established time parameters 634; and forwarding 638 copies of the collaborative email document to delegated backup collaborators in accordance with the established time parameters.

Time parameters are implemented as data elements that establish time limits within which collaborators are to complete editing of a collaborative email document and time limits within which signatories are to sign a document. Using an email client program adapted according to embodiments of the present invention, a user may establish 632 time parameters 634 by operating a user interface such as the one on the exemplary email client illustrated in FIG. 3 by, for example, selecting the 'CollabOptions' button on toolbar 304 and then selecting the 'Establish Time Parameters' entry 322 from the resulting pop-up menu 314. Selecting the 'Establish Time Parameters' entry 322 in turn presents a data entry screen (not shown) through which a user may enter time parameters for a collaborative email document so that they are stored, for example, in a data structure such as the one illustrated at reference 409 on FIG. 4. Reminders typically are implemented as separate email messages or instant text messages reminding a collaborator, a signatory, or an administrator of a time limit or deadline to be met in the future. Alerts typically are implemented as separate email messages or instant text messages reminding a collaborator, a signatory, or an administrator of a time limit or deadline that has passed.

Forwarding 638 copies of the collaborative email document to delegated backup collaborators in accordance with the established time parameters typically is carried out when a time limit or deadline has passed without completion of the editing required by the deadline. Forwarding copies to delegated backup collaborators may be implemented, for example, by emailing copies from an administrative client to the delegated backup collaborators. The 'From:' field (310 on FIG. 3) in email clients according to embodiments of the present invention is often reserved for the identification of signatories, and communications of revisions among collaborators, including delegated backup collaborators are carried out synchronously or asynchronously as described in this specification.

Updating 512 copies of a collaborative email document with revisions is typically carried out by communicating the revisions asynchronously to the collaborators and to the administrative client. Asynchronous communication of revisions is useful because the collaborators' clients may not be on-line on the network to receive the revisions at the time when they are created. Asynchronous communication of revisions is carried out by use of server-side data structures such as those shown in FIG. 4, for example. The email clients may be programmed to transmit the revisions in a standard message format such as HTTP (the HyperText Transport Protocol), WAP (the Wireless Access Protocol), HDTP (the Handheld Device Transport Protocol), or others as will occur to those of skill in the art. The server may support a Java Servlet or a CGI script, or other server-side functionality as will occur to those of skill in the art, for receiving the revisions and recording them in a database supporting data structures similar to the exemplary ones set forth in FIG. 4. In this way, the revisions are stored on the server and remain available for download to collaborators' email clients when the clients go on-line on the network to retrieve the revisions for updating their copies of the documents.

The exact method of updating a copy of a document on an email client may be determined or selected by one or more setup parameters in the client. Updating a copy of a document by downloading revisions from a server may be carried out, for example, every time an email client is activated and at periodic intervals so long as the email client is operative. The periodic updates may be programmed to continue in background as long as the email client is running on a client machine even when the local copy of the document is not open for editing, so that when the copy opened for editing, it is likely to be fully synchronized with the latest revisions. Alternatively, a collaborator may wish to view the revisions since his or her last review of the document one at a time, stepping through them by use of, for example, a 'Version Forward' button like the one illustrated in the toolbar at reference 306 on the email client of FIG. 3. In this case, the collaborator would turn off the email client's setup parameter for automatic background updates.

In addition to asynchronous updates implemented through a server, updating 512 the collaborators' copies of a collaborative email document with revisions may be carried out by communicating the revisions synchronously to one or more collaborators as the revisions are made. Synchronous communications of revisions may be implemented by use of messages in an instant messaging protocol. Examples of instant messaging protocols useful with various embodiments of the present invention include the Instant Messaging and Presence Protocol ("IMPP") specified by the IMPP Working Group of the Internet Engineering Task Force and the Mitre Corporation's Simple Instant Messaging and Presence Service ("SIMP").

Figure 7:
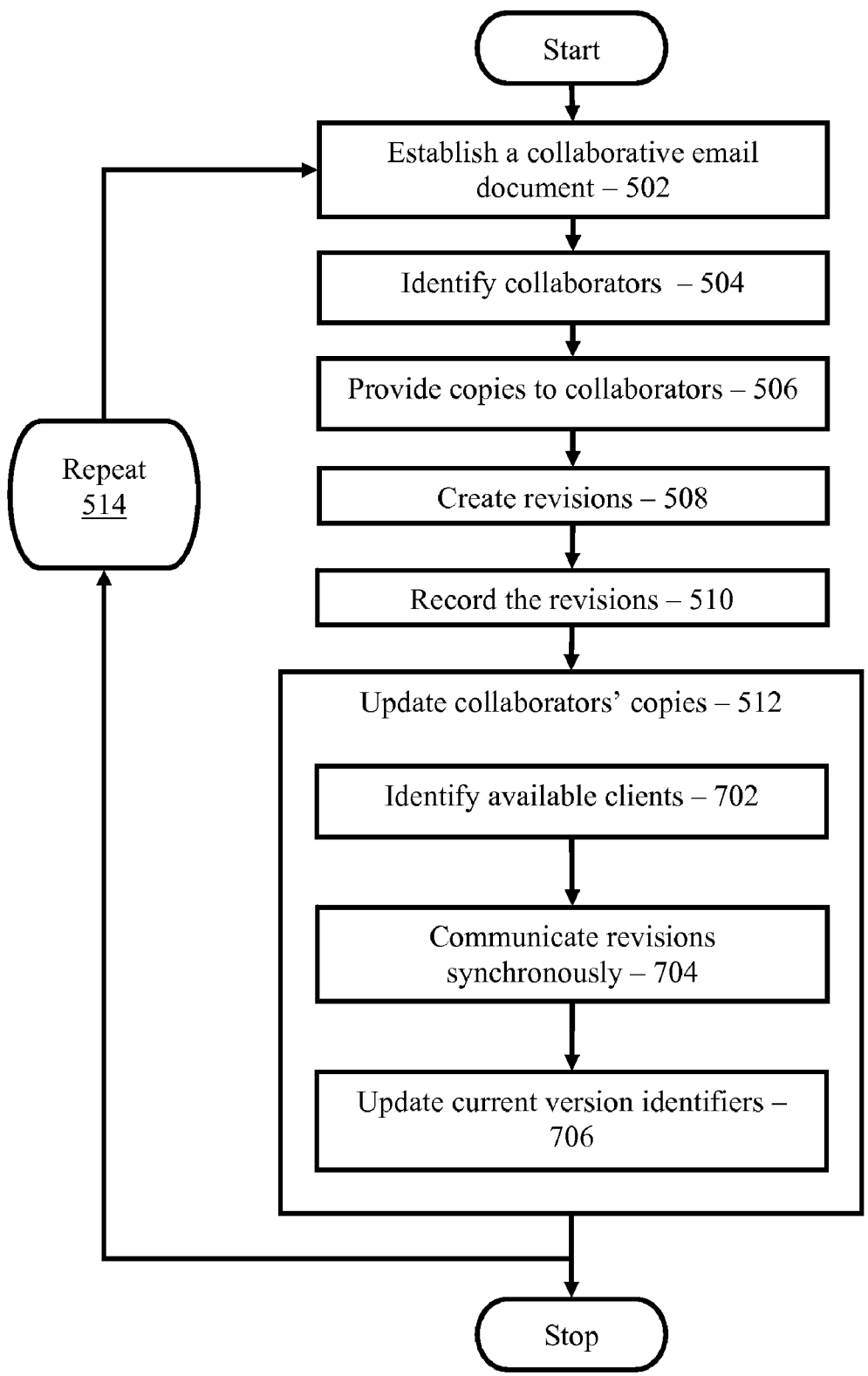
FIG. 7 sets forth a flow chart illustrating a method of synchronous communications of revisions.

For further explanation, FIG. 7 sets forth a flow chart illustrating a method of synchronous communications of revisions. In the method of FIG. 7, updating 512 copies of a collaborative email document with revisions includes identifying 702 collaborator clients that are available for synchronous communications of revisions. Instant messaging services generally define and support 'presence services' that provide indications whether an instant messaging client is on-line. Email clients capable of supporting synchronous communications of revisions according to embodiments of the present invention often are improved to support messaging and presence detection through one or more instant messaging protocols. The method of FIG. 7 includes communicating 704 revisions synchronously to collaborator clients that are available for synchronous communications, typically carried out by transmitting the revisions in instant messages to all collaborators' email clients that are determined to be presently on-line and available for instant messaging.

Updating copies of documents synchronously affects their version identifications. In the method of FIG. 7, therefore, updating the collaborators' copies includes updating 706 current version identifications for the copies of the document on collaborator's clients that are available for synchronous communications. Updating current version identifications may be implemented with HTTP messages, for example, from a client to a server that maintains server-side data structures like those shown in FIG. 4. Such a server typically supports server-side functionality such as a Java servlet or a CGI script programmed to update version identifications in response to a message from a client bearing a collaborator identification 412 and a document identification 404.

By way of further explanation, it is noted that synchronous updates and asynchronous updates are advantageously employed together. When synchronous communications of revisions are employed for collaborators' copies that are not synchronized with the latest revisions, there is a risk that the asynchronous revisions will be applied to a copy out of proper sequence, thereby causing confusion in the copy of the document on that collaborator's client. Synchronous communications of revisions therefore are beneficially implemented for collaborators copies of a document after collaborators' copies are synchronized with the latest revisions from an asynchronous source of revisions.

In the method of FIG. 7, for example, identifying 702 collaborator clients that are available for synchronous communications of revisions typically also includes determining whether collaborators copies are synchronized with the latest revisions.

Determining whether collaborators copies are synchronized with the latest revisions may be accomplished by comparing a current version identification (414 on FIG. 4) for each collaborator's copy of a document with the latest revision identification 416 in a revision table such as the one exemplified at reference 422 on FIG. 4. To the extent that it is determined that the version of a collaborator's copy on an email client that is 'present,' available for synchronous communications of revisions, is not the current version of the document, that copy may be updated by applying all the revisions later than its current revision number—and then updating its current version identification 414 to the latest version number.

It will often be the case that some collaborators on a document engage in synchronous communications of revisions when other collaborators on the same document are unavailable for synchronous communications of revisions. Email clients according to embodiments of the present invention therefore often transmit all revisions for storage on a server for later asynchronous downloads by the other collaborators at their convenience. In this way, even a collaborator who begins a synchronous session with other collaborators and logs off in the middle of the session, can later obtain the intervening revisions by asynchronous download from the server. When such a collaborator logs off during synchronous communication of revisions, the email client advantageously records the current version identification for that collaborator's copy of the document in a data structure such as that shown at reference 414 in FIG. 4, for example. When the collaborators log off at the end of synchronous communication of revisions, their email clients advantageously record the current version identification for each collaborator's copy of the document in a data structure such as the exemplary one shown at reference 414 in FIG. 4.

An exemplary use case is now presented by way of further explanation of the construction and operation of systems and methods for writing collaborative email documents with delegable authorities for signing, viewing, and editing the documents: Using an email client program adapted according to embodiments of the present invention, a user operates a user interface such as the one on the exemplary email client illustrated in FIG. 3 to create a collaborative email document by, for example, selecting the 'CollabOptions' button on toolbar 304 and then selecting the 'Create Collaborative Email Document' entry 315 from the resulting pop-up menu 314.

The user then may identify signatories of the collaborative email document by entering them manually in the 'FROM' field or by selecting them from a predefined group list. In one embodiment, the originating user also may select a template for the document to be created, which may have one or more sections, that is, identified editable portions. At this time, the user may operate a control such as the one named 'Establish Authority Delegation Type Parameters,' shown at reference 318 on FIG. 3, to actuate authority delegation type parameters, thereby making effective one or more modes of delegating signature authority. Authority delegation type parameters may include, for example, the following:

_No_delegation
_Delegation_by_policy_only
_Delegation_by_originator_only
_Delegation_by_all_collaborators
_Delegation_by_specified_collaborators The originating use also selects at this time the collaborators to the document in addition to the signers of the document. The user may enter the collaborators through a data entry field such as the one shown at reference 312 on FIG. 3. The user may select collaborators from a predefined list. A predefined list may be implemented in a table on the email client or in a server for collaborative email. Alternatively, a predefined list may be embedded as part of a template for a collaborative email document, a template which the user may or may not be granted authority to amend. If delegations of signature authority by contributor is a supported mode of delegation and the authority delegation type parameter '_Delegation_by_specified_collaborators' is actuated, the email client is programmed to prompt the originator to enter or select those collaborators allowed to delegate. Alternately, a default listing of specified collaborators with delegation authority is included as a part of the template, which the originator may or may not be authorized to override.

Collaborators to the document may be restricted to viewing or editing one or more parts of the document. Signatories may (or may not) be designated as collaborators also and so therefore may have rights to edit for the entire document or parts of the document. Rights to edit all or parts of the document may be assigned as part of the template for the document. Collaborators may have the option to further delegate reading, editing, and signing rights. Default rights to edit or sign also may be commemorated in a template for the collaborative email document, and an originator or a collaborator may or may not be assigned the authority to override template defaults.

One or more of the signers of the document may indicate approval of the content at any time by, for example, selecting a button such as the one labeled 'Sign' in the toolbar shown at reference 306 on FIG. 3. If a signatory's delegate signs the document or a portion of the document, the document may display "signed by" the contributor or "signed by [delegate name] for [collaborator name]. In one embodiment, for example, a signatory may have delegated edit authority for a plurality of document sections to one or more delegates. Once the delegates have completed their edits, the signatory may then be provided with the option to sign the document. As an option, a person delegating edit authority on portions of the document may automatically approve and digitally sign the document upon approval by all of those to whom the document or its sections have been delegated.

The draft document is saved a signatory's digital signature and forwarded to other signatories for their signatures. Additional edits may be made after the first signatory signs. If a second signatory adds edits, the second form of the signed document does not match the original signed document, thereby rendering the first signature invalid, and the draft is again forwarded to all signatories with an indication of the differences between the two signed documents. Delegated authorities apply to the document in draft form, to the document after it has been signed by less than all signatories, and to additional edits applied after signing by less than all signatories.

The draft document may be opened for viewing or editing by a plurality of collaborators and signatories, and an instant messaging or VOIP (Voice Over Internet Protocol) session may also be opened. Thus, instead of forcing the sending of multiple versions among signatories, a meeting may be scheduled during which the signatories agree on a final edition and attach their digital signatures to a final form of the document. This exemplary synchronous procedure, by comparison with the round-robin method described above, provides a convenient way of arranging multiple signatures and sending the collaborative email document. In this example, delegated authorities apply to a document in draft form, to a document signed by less than all signatories, and to additional edits applied after signing by less than all signatories, as well as to edits affected during instant messaging and/or VOIP sessions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for writing a collaborative email document with delegable authorities, the system comprising:
    means for establishing a hierarchy of delegation authority for signatures;
    means for establishing at least one authority delegation policy comprising at least one rule for automated delegation of signature authority among signatories in the hierarchy, wherein rules for automated delegation of signature authority comprise:
        a first rule that the signature authority of a first signatory means for having a first position in a hierarch of delegation authority may be delegated to a second signatory means for having a second position in the hierarchy of delegation authority, wherein the second position is higher in the hierarchy than the first position;
        a second rule that a first signatory means for having a first position in the hierarchy of delegation authority may digitally sign the collaborative email document only after a second signatory means for having a second position in the hierarchy of delegation authority has signed the collaborative email document, wherein the second position is higher in the hierarchy than the first position;
        a third rule that signature authority is to be delegated to a second signatory if a first signatory does not sign the document within a specified period of time; and
        a fourth rule that signature authority may be delegated during a specified period of time;
    means for establishing a collaborative email document on an administrator's computer;
    means for establishing time parameters for writing the collaborative email document;
    means for providing alerts and reminders in accordance with the established time parameters;
    means for forwarding copies of the collaborative email document to delegated backup collaborators in accordance with the established time parameters;
    means for identifying one or more signatories for the document;
    means for identifying editable portions of the email document;
    means for specifying that only certain collaborators are authorized to view and edit one or more portions of the document;
    wherein authority to view and edit one or more portions of the document includes authority to delegate to another collaborator the authority to view and edit one or more portions of the document;
    means for providing to the collaborators copies of the document for viewing and editing, wherein the collaborators' copies reside on collaborators' computers;
    means for updating the copies of the document on collaborators' computers with revisions from the collaborators;
    means for delegating signature authority from at least one signatory to another signatory in accordance with the authority delegation policy; and
    means for sending the collaborative email document from the administrator's computer to addressees when the document bears valid digital signatures from all signatories.

2. A computer program product for writing a collaborative email document with delegable authorities, the computer program product comprising:
    a magnetic or optical recording medium;
    means, recorded on the recording medium, for establishing a hierarchy of delegation authority for signatures;
    means, recorded on the recording medium, for establishing at least one authority delegation policy comprising at least one rule for automated delegation of signature authority among signatories in the hierarchy, wherein rules for automated delegation of signature authority comprise:
        a first rule that the signature authority of a first signatory means, recorded on the recording medium, for having a first position in a hierarchy of delegation authority may be delegated to a second signatory means, recorded on the recording medium, for having a second position in the hierarchy of delegation authority, wherein the second position is higher in the hierarchy than the first position;
        a second rule that a first signatory means, recorded on the recording medium, for having a first position in the hierarchy of delegation authority may digitally sign the collaborative email document only after a second signatory means, recorded on the recording medium, for having a second position in the hierarchy of delegation authority has signed the collaborative email document, wherein the second position is higher in the hierarchy than the first position;
        a third rule that signature authority is to be delegated to a second signatory if a first signatory, does not sign the document within a specified period of time; and
        a fourth rule that signature authority may be delegated during a specified period of time;
    means, recorded on the recording medium, for establishing a collaborative email document on an administrator's computer;
    means, recorded on the recording medium, for establishing time parameters for writing the collaborative email document;
    means, recorded on the recording medium, for providing alerts and reminders in accordance with the established time parameters;
    means, recorded on the recording medium, for forwarding copies of the collaborative email document to delegated backup collaborators in accordance with the established time parameters;
    means, recorded on the recording medium, for identifying one or more signatories for the document;

means, recorded on the recording medium, for identifying editable portions of the email document;

means, recorded on the recording medium, for specifying that only certain collaborators are authorized to view and edit one or more portions of the document;

wherein authority to view and edit one or more portions of the document includes authority to delegate to another collaborator the authority to view and edit one or more portions of the document;

means, recorded on the recording medium, for providing to the collaborators copies of the document for viewing and editing, wherein the collaborators' copies reside on collaborators' computers;

means, recorded on the recording medium, for updating the copies of the document on collaborators' computers with revisions from the collaborators;

means, recorded on the recording medium, for delegating signature authority from at least one signatory to another signatory in accordance with the authority delegation policy; and means, recorded on the recording medium, for sending the collaborative email document from the administrator's computer to addressees when the document bears valid digital signatures from all signatories.

* * * * *